United States Patent
Fraser et al.

[19]

[11] Patent Number: 6,096,248
[45] Date of Patent: Aug. 1, 2000

[54] METHOD FOR REDUCING MOLD FOULING

[75] Inventors: Cameron R. Fraser; James W. Hoover, both of Akron, Ohio

[73] Assignee: Flow Polymers, Inc., Cleveland, Ohio

[21] Appl. No.: 09/372,731

[22] Filed: Aug. 11, 1999

Related U.S. Application Data

[60] Provisional application No. 60/117,365, Jan. 27, 1999.

[51] Int. Cl.$^7$ .................................................. B29C 35/00
[52] U.S. Cl. ........................... 264/39; 264/325; 264/326; 264/349; 425/225
[58] Field of Search .............................. 264/39, 130, 131, 264/320, 325, 326, 349, 169, 338; 425/28.1, 225, 226, 227

[56] References Cited

U.S. PATENT DOCUMENTS

| | | |
|---|---|---|
| 3,476,599 | 11/1969 | Grover et al. ............................ 264/39 |
| 3,617,377 | 11/1971 | Isshiki et al. . |
| 3,645,940 | 2/1972 | Stephens et al. . |
| 3,779,960 | 12/1973 | Araki et al. . |
| 3,830,762 | 8/1974 | Abbott . |
| 3,941,907 | 3/1976 | Klement et al. ........................ 264/338 |
| 3,990,823 | 11/1976 | Le Moullac . |
| 4,005,040 | 1/1977 | Maher . |
| 4,092,279 | 5/1978 | Piskoti . |
| 4,343,339 | 8/1982 | Schwindt et al. . |
| 4,385,164 | 5/1983 | Sinclair et al. . |
| 4,521,479 | 6/1985 | Maglio et al. . |
| 4,673,438 | 6/1987 | Wittwer et al. . |
| 4,942,192 | 7/1990 | Yasuda et al. . |
| 5,095,054 | 3/1992 | Lay et al. . |
| 5,234,988 | 8/1993 | Brooks et al. . |
| 5,279,784 | 1/1994 | Bender et al. . |
| 5,371,136 | 12/1994 | Brooks et al. . |
| 5,374,671 | 12/1994 | Corvasce et al. . |
| 5,403,371 | 4/1995 | Engdahl et al. . |
| 5,462,617 | 10/1995 | Bender et al. . |
| 5,545,680 | 8/1996 | Corvasce et al. . |
| 5,650,454 | 7/1997 | Hoover et al. . |
| 5,672,639 | 9/1997 | Corvasce et al. . |
| 5,766,749 | 6/1998 | Kakinoki et al. . |
| 5,840,801 | 11/1998 | Gardiner . |
| 5,877,244 | 3/1999 | Hoover et al. . |

FOREIGN PATENT DOCUMENTS

WO 98/45371  10/1998  WIPO .

OTHER PUBLICATIONS

Reference to Japanese Pat. No. 874021, dated Oct. 28, 1999, Title: "Method for inhibiting fouling of mold by adding benzotriaszoles to rubber compositions and rubber compositions".

Reference to Japanese Pat. No. 94145017, dated May 24, 19994, Title: "Antifouling compositions and articles therewith".

Reference to Japanese Pat. No. 93 55491, dated Feb. 24, 1992, Title: "Silicone–based antifouling function–imparting agents".

Reference to Japanese Pat. No. 91255141, dated Nov. 14, 1991, Title: "Foaming of thermoplastics with azodicarbonamide".

(List continued on next page.)

*Primary Examiner*—Mathieu D. Vargot
*Attorney, Agent, or Firm*—Pearne & Gordon LLP

[57] ABSTRACT

A method of reducing fouling of a mold caused by vulcanization of a rubber compound in the mold. Pursuant to the method, about 0.2–20 phr of a fouling inhibitor composition comprising starch is added to the rubber compound before the rubber compound is vulcanized in the mold. The fouling inhibitor composition is substantially free of cross-linked fatty acids, asphalt, tackifying resins, and synthetic plasticizers. More molding cycles can be run before the mold is cleaned.

23 Claims, 1 Drawing Sheet

OTHER PUBLICATIONS

Reference to Japanese Pat. No. 91234736, dated Oct. 18, 1991, Title: "Process for molding poly(vinylidene chloride) without contamination of apparatus".
Reference to Japanese Pat. No. 86281141, dated Dec. 11, 1986, Title: "Ruber compositions".
Reference to European Pat. No. 209891, dated Jan. 28, 1987, Title: "Phosphonate vulcanization accelerators for fluroelastomers".
Reference to Title: "Prevention of rubber mold fouling", Takashi Nakagawa, Nippon Gomu Kyokaishi, 1985, vol. 58, ISS.6, pp. 396–402.
Reference to Title: "Prevention of rubber mold fouling", Yasuyoshi Furukawa, Nippon Gomu Kyokaishi, 1985, vol. 58, ISS.6, pp. 392–395.
Reference to Title: "Prevention of rubber mold fouling", Taiji Asada, Nippon Gomu Kyokaishi, 1985, vol. 58, ISS.6, pp. 385–391.
Reference to Title: "Prevention of mold fouling", Hozumi Sato, Yoshiaki Kawamura, and Yoshihiko Takemura, Nippon Gomu Kyokaishi, 1985, vol. 58, ISS.6, pp. 380–384.
Reference to Title: "Prevention of rubber mold fouling", Hideo Kaneko, Nippon Gomu Kyokaishi, 1985, vol. 58, ISS.6, pp. 675–379.
Reference to Japanese Pat. No. 80108430, dated Aug. 20, 1980, Title: "Prevention of metal mold fouling in molding of rubber compositions".
Reference to Japanese Pat. No. 80108429, dated Aug. 20, 1980, Title: "Prevention metal mold fouling during molding of rubbers".
Abstract of Title: "Reinforcement with Fluoroplastic Additives", R.A. Morgan, C.W. Stewart, E.W. Tjp,as. W.M.Stahl, Rubber World 204, (2) May 1991, pp. 25–28.
Reference to Trade name: "Mold Mates", No author, Official Gazette of the US Patents and Trademarks Office: Trademarks 1999 1222, No. 4, May 25, 1999, p. 316.
Abstract of European Patent No. EP 874021 A1, dated Oct. 28, 1998, Title: "Method and composition for inhibiting mould fouling".
Abstract of Title: "Top 10 moulding problems", R. Wilkinson, E.A. Poppe, K. Leidig, and K. Schirmer, Plast.Rubb.Wkly., 1998, No. 1728, Mar. 20, 1998, p. 9.
Abstract of Title: "Processing of elastomers: coatings for tooling", D. Repenning and J.F. Tirlet, Plast.Mod.Elast. 1996, 48, No.1, Jan./Feb. 1996, pp. 45–47.

Abstract of Title: "Selecting the optimum coagent for several rubber applications", R. Coastin and W. Nagel, conference paper, 1995 Cleveland, Oh., Oct. 17th–20th, 1995, Paper 97, p. 31.
Abstract of Title: "New range of fluoroelastomers with improved processing characteristics", P. Ferrandez and S. Bowers, Ind.d.Gomma 1994 38, No. 9, Sep. 1994, pp. 39–44.
Abstract of Title: "Fluorel 5000 series: a new generation of improved processing fluorocarbon elastomers", I. Tauber and D. Arren, 1995 Gothenburg, May 9th–12th, 1995, Paper G2, p. 9.
Abstract of Title: "Improved Technologies for elastomer processing", U. Meirtoberens, Ch Herschbach and R. Maass, Int.Polym.Sci.Technol. 1994 21, No. 12, 1994, pp. T/1–9.
Abstract of PCT Pat. No. WO 9422930 A1, dated Oct. 13, 1994, Title: "Process for producing fluoroelastomer".
Abstract of Title: "Mould fouling and countermeasures", K. Yamaguchi and A. Yukawa, Int.Polym.Sci.Technol. 1994 21, No. 4, 1994, pp. T/38–49.
Abstract of Title: "Mould fouling and steps to cope with it", K. Yamaguchi and A. Yukawa, Nippon Gomu Kyokaishi 1993 66, No. 10, 1993, pp. 695–705.
Abstract of Title: "Mould fouling and ways of removal", P. Barth, Kaut.U.Gummi Kunst. 1988 41, No. 10, Oct. 1988–, pp. 1003–1008.
Reference to Title: "Prevention of Mould fouling with various rubbers", Y. Furukawa, Int.Polym.Sci.Technol. 186 13, No. 1, 1986, pp. T/34–37.
Reference to Title: "Prevention of mould fouling with various rubbers", S. Kita, Int.Polym.Sci.Technol. 1985 12, No. 12, 1985, pp. T30–32.
Reference to Title: "Mould coatings to prevent fouling", S. Hanazano, Int.Polym.Sci.Technol. 1985 12, No. 12, 1985, pp. T24–25.
Reference to Title: "Antifouling characteristics of mould release agents", M. Shinjo and I. Hisamoto, Nippon Gomu Kyokaishi 1985 58, No. 6, 1985, pp. 362–368.
"Lux researchers develop tires using starch", *Akron Daily Digest*, Jun. 15, 1998, pp. 1–2.

METHOD FOR REDUCING MOLD FOULING

CROSS-REFERENCE TO RELATED APPLICATION

This application claims the benefit of U.S. Provisional Application Ser. No. 60/117,365, filed Jan. 27, 1999.

BACKGROUND OF THE INVENTION

This invention generally relates to the molding of elastomeric materials and in particular to methods and compositions for reducing fouling of a mold caused by vulcanization of rubber compounds in the mold.

A rubber compound is often vulcanized in a mold to form a product, such as a tire. During vulcanization, materials, such as sulfur, zinc salts, oils, and waxes tend to migrate from the rubber compound and deposit on the mold. Repeated vulcanization of rubber compounds in the mold causes the material to build up on the mold. This buildup of material is commonly referred to as "mold fouling".

Mold fouling reduces the aesthetic value of a molded product, and can degrade the physical properties of the molded product.

In order to prevent the foregoing adverse effects of mold fouling, a mold has to be periodically cleaned. In the tire industry, an automobile tire mold is typically cleaned every thirty (30) days. Since an automobile tire mold is typically used to vulcanize about 4 tires per hour, 24 hours per day, which is about 100 tires per day, an automobile tire mold is typically cleaned after 3000 tires have been vulcanized in the tire mold. For other rubber products, the number of products that can be vulcanized in a mold before the mold is cleaned may be less.

A mold is typically cleaned by either particle blasting or immersion in a cleaning liquid. Particles commonly used in the blasting method include sand, carbon dioxide pellets, walnut shells, and beads composed of plastic, glass, ceramic, or metal. Cleaning liquids commonly used in the immersion method include strong acids, such as hydrochloric acid, sulfuric acid, and nitric acid, or strong alkalis, such as caustic soda, or solvents.

The foregoing cleaning methods are rather costly and tend to damage and/or contaminate molds. Moreover, production is lost when molds are being cleaned. Accordingly, attempts have been made to reduce the frequency with which molds must be cleaned.

Release agents have been developed that are comprised of waxes, fatty acids, polytetrafluoroethylene (PTFE), and metallic soaps. These release agents migrate to the surface of the rubber composition during vulcanization to form a lubricating film between the rubber composition and the mold. The release agents prevent the rubber composition from sticking to the mold, but do not abate mold fouling.

Molds have also been plated with chrome and coated with polytetrafluoroethylene (PTFE) and other materials to reduce mold fouling. These techniques, however, have had only limited success in reducing mold fouling.

Based on the foregoing, there is a need in the art for a method for reducing mold fouling. The present invention is directed to such a method.

SUMMARY OF THE INVENTION

A method of reducing fouling of a mold caused by vulcanization of a rubber compound in the mold is provided. The method comprises the steps of adding about 0.2–20 phr of a fouling inhibitor composition to the rubber compound and thereafter vulcanizing the rubber compound in the mold. The fouling inhibitor composition comprises starch and is substantially free of cross-linked fatty acids, asphalt, tackifying resins, and synthetic plasticizers.

Also provided is a method of producing vulcanized rubber compounds. In accordance with the method, a mold is provided. A vulcanizable rubber compound is also provided wherein the vulcanizable rubber compound contains about 0.2–20 phr of a fouling inhibitor composition comprising starch. The vulcanizable rubber compound is placed in the mold and the rubber compound is vulcanized to form a vulcanized rubber compound. The vulcanized rubber compound is then removed from the mold. The foregoing steps are repeated until a mold-cleaning interval is reached that is at least 10 percent greater than the regular mold-cleaning interval for that mold.

BRIEF DESCRIPTION OF THE DRAWINGS

The features, aspects, and advantages of the present invention will become better understood with regard to the following description, appended claims, and accompanying drawings where:

DETAILED DESCRIPTION OF THE PREFERRED EMBODIMENTS OF THE INVENTION

Figure 1:
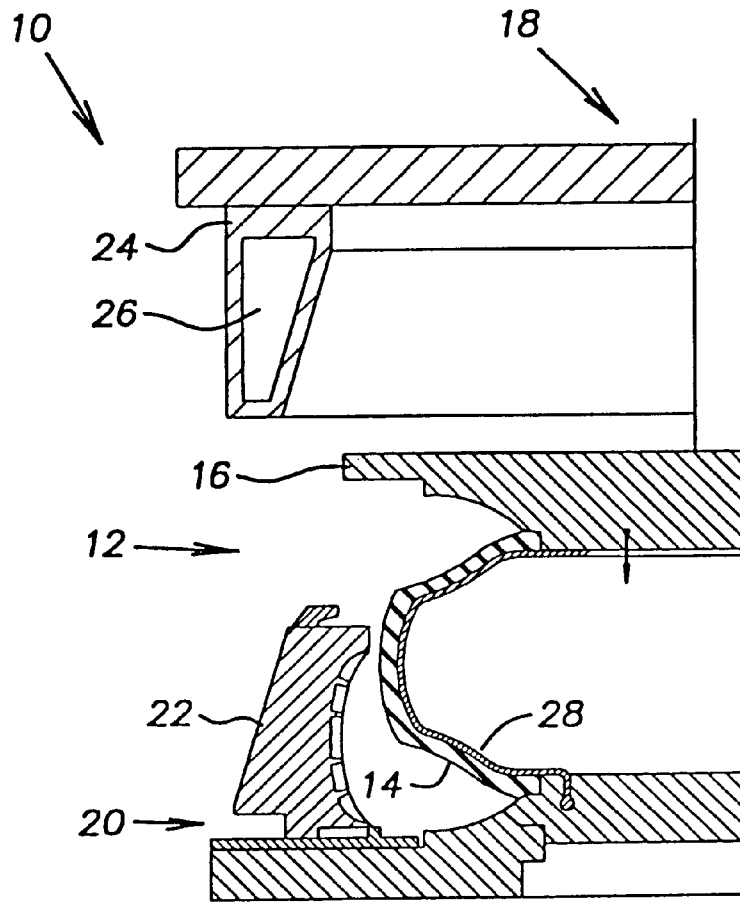
FIG. 1 shows a partial sectional view of a tire press having a mold with a top section positioned between an open and a closed position.

It should be noted that parts are parts by weight and percents are weight percents unless otherwise indicated or apparent. In addition, when a preferred range such as 5–25 is given, this means preferably at least 5 and preferably not more than 25.

As used herein, the term "phr" means parts by weight of a respective material per 100 parts by weight of rubber or elastomer.

As used herein, the term "synthetic plasticizer" shall mean a polymeric material that is compatible with starch, has a softening point lower than the softening point of starch, and is selected from the group consisting of vinyl acetate copolymers, acrylic copolymers, maleic anhydride copolymers, and hydrolyzed forms thereof, and polyvinyl alcohol, cellulose acetate, and diesters of dibasic organic acids.

As used herein, the term "cross-linked fatty acid" shall mean vegetable oil fatty acid that has been cross-linked with an organic peroxide.

As used herein, the term "starch" includes modified starch and dextrin, but excludes destructured starch. The term modified starch excludes destructured starch.

As used herein, a "cycle" refers to one use of a mold to form a molded rubber product.

As used herein, a "mold-cleaning interval" is the total number of cycles that are run between cleanings of the mold.

As used herein, "regular mold-cleaning interval" means the number of cycles that are ordinarily or customarily run on that mold between cleanings of the mold when the vulcanizable rubber compound being molded does not include the inventive fouling inhibitor composition of the present invention.

As used herein, "necessary mold-cleaning interval" is the maximum number of cycles that can be run between cleanings of the mold before the mold must be cleaned in order to produce a commercially acceptable vulcanized rubber product.

The fouling inhibitor composition of the present invention is comprised of starch and is free or substantially free of cross-linked fatty acids, asphalt, tackifying resins, and synthetic plasticizers. The fouling inhibitor composition is preferably 60–100, more preferably 75–100, more preferably 80–100, more preferably 85–98, more preferably 88–94, preferably at least 10, 20, 30, 40, 50, 60, 70, 80, 90 or 95, more preferably about 90, weight percent starch. The fouling inhibitor composition is for addition to a vulcanizable rubber compound and has the following preferred formulation (Formulation 1).

| | Weight percent | | | |
|---|---|---|---|---|
| Component | Preferred | Less Preferred | Less Preferred | Less Preferred |
| 1. Starch | 90 | 88–94 | 85–98 | 85–100 |
| 2. Processing promoter | 10 | 6–12 | 2–15 or 1-15 | 0–15 |

As is well known, starch is a high molecular weight carbohydrate of the general formula $(C_6H_{10}O_5)_n$ comprised of linear (amylose) and branched (amylopectin) polymers of (alpha)-D-glucopyranosyl units. Typically, starch is composed of about 25 percent amylose and about 75 percent amylopectin.

It is known to use a composite comprised of starch and a synthetic plasticizer as a filler for rubber products as is disclosed in U.S. Pat. No. 5,672,639 to Corvasce et al. which is incorporated herein by reference. It is also known to use starch combined with the polymer chains of cross-linked fatty acids so as to increase the tear resistance of rubber products as is disclosed in U.S. Pat. No. 5,650,454 to Hoover et al, which is assigned to the assignee of the present invention, and is incorporated herein by reference.

Surprisingly, it has been found that when a composition that comprises starch is added to rubber products before they are vulcanized in a mold, the composition greatly reduces fouling of the mold. Accordingly, the fouling inhibitor composition of the present invention comprises starch and is preferably free or substantially free of cross-linked fatty acids, asphalt, tackifying resins, synthetic plasticizers and any other components which are known in the prior art and which are similar to these, except for the processing promotor described herein.

The starch used in the invention is preferably plant starch, preferably barley starch, wheat starch, rice starch, tapioca starch, arrowroot starch or potato starch, more preferably corn starch. The starch is preferably unmodified, such as unmodified corn starch. Less preferably the starch is dextrin or, even less preferably, modified starch. The definition of modified starch found in Hawley's Condensed Chemical Dictionary, 12th Edition, is incorporated herein by reference.

Preferably, the starch is unmodified corn starch, such as is sold by Grain Processing Corp. of Muscatine, Iowa. Preferably, the corn starch has a specific gravity of about 1.5 and a moisture content, by weight, of about 12% or less, preferably 5% or less. Preferably, the corn starch is a fine powder with about 85% passing through a 200 mesh screen (U.S. Standard Sieve No. 200) and about 45% passing through a 325 mesh screen (U.S. Standard Sieve No. 325).

A processing promoter helps improve the processing characteristics of the vulcanizable rubber. Preferably, the processing promoter is factice, which is a polymerization product of natural fatty oils and sulfur or sulfur chloride. More preferably, the processing promoter is factice sold by Akrochem under the tradename Akrofax 57. Less preferably, the processing promoter is polyethylene wax, such as polyethylene wax sold by Allied Signal under the tradename AC617-A. Less preferably, other processing promoters which improve the processing characteristics of the vulcanizable rubber may be used.

The processing promoter is considered optional because it does not significantly enhance the fouling inhibition properties of the inventive fouling inhibitor composition. The processing promoter, however, is preferably included because it helps improve the processing characteristics of the vulcanizable rubber to which the inventive fouling inhibitor composition is added.

The fouling inhibitor composition of the present invention can be used in many different types of vulcanizable rubber and other elastomers that are cured in molds. The fouling inhibitor composition finds particular utility in vulcanizable rubber used for building tires.

The fouling inhibitor composition is added to vulcanizable rubber in an amount so there are about 0.2–20, more preferably 0.3–15, more preferably 0.5–15, more preferably 0.5–10, more preferably 1–15, more preferably 1–10, more preferably 1–7, more preferably 2–7, more preferably 2–4 or 3–5, more preferably about 3, parts inventive fouling inhibitor composition per hundred parts rubber.

Preferably, the vulcanizable rubber to which the fouling inhibitor composition is added comprises rubber selected from the group consisting of natural rubbers, synthetic rubbers, and mixtures thereof. The synthetic rubbers are preferably styrene-butadiene rubber, isobutylene-based rubbers such as butyl rubber, halobutyl rubber, and isobutylene-paramethylstyrene copolymer rubber, polychloroprene rubber, polybutadiene rubber, polyisoprene rubber, EPDM rubber, epichlorohydrin rubber and nitrile rubber. Less preferably, the synthetic rubbers are acrylic, chlorinated polyethylene, ethylene/acrylic, EPM, isoprene-acrylonitrile, polyisobutylene, polynorbornene, and styrene-isoprene.

The vulcanizable rubber compound may include accelerators, retarders, activators, vulcanizers, antioxidants, antiozonants, plasticizers, processing aids, stabilizers, tackifiers, extenders, fillers, reinforcing materials, blowing agents, lubricants, polymerization materials, and other rubber compounding materials known in the art.

The mixing of the vulcanizable rubber compound can be accomplished by methods known to those having skill in the rubber mixing art. For example, the vulcanizable rubber compound can be mixed using internal mixers, extruders, and twin screw extruders. Preferably, the vulcanizable rubber compound is mixed in stages. In one or more non-productive stages, the filler, tackifiers, lubricants, etc. are mixed with the rubber at an elevated temperature, while in a subsequent productive stage, the vulcanizers and accelerators are added at a lower temperature. Preferably, the fouling inhibitor composition is added to the vulcanizable rubber compound in one of the non-productive stages.

The vulcanizable rubber compounds find particular utility for tires, tire treads and sidewalls, coating stocks, gaskets, seals, grommets, hoses, belting, innertubes, other rubber parts for automobiles, rubber boots and shoes, tubing, stoppers, medical goods made of medical grade rubber, other molded rubber goods, general purpose rubbers, and other uses.

Figure 2:
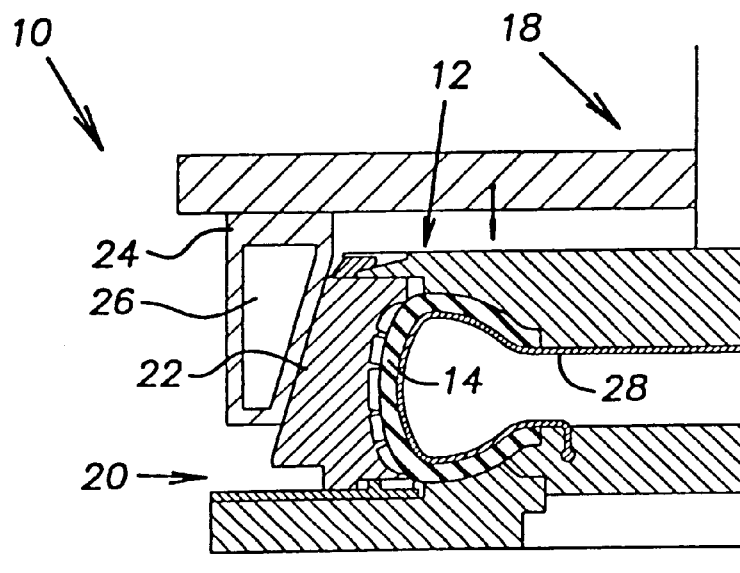
FIG. 2 shows a partial sectional view of the tire press with the top section of the mold in the closed position.

Referring now to FIGS. 1 and 2, there are shown partial sectional views of a tire press 10 having a mold 12 with which the method of the present invention may be practiced. The mold 12 is adapted to hold an intermediate rubber product, such as a green or unfinished tire 14, during a vulcanization process. The mold 12 includes a top section 16 connected to a closing mechanism 18, such as a press, and a bottom section 20 which may be comprised of a plurality of sectors 22 disposed together to form a ring. The closing mechanism 18 is operable to move the top section 16 between an open position (not shown) and a closed position (shown in FIG. 2). When the top section 16 is in the open position, the top section 16 is spaced from the bottom section 20 so as to permit the green tire 14 to be loaded into the bottom section 20. When the top section 16 is in the closed position, the top section 16 is disposed on the bottom section 20.

The closing mechanism 18 may be provided with a skirt 24 having a passage 26 extending therethrough. Heating fluid, such as steam or hot water is circulated through the passage 26 to heat the sectors 22 during vulcanization of the intermediate rubber product 14 when the top section 16 is in the closed position.

An inflatable bladder 28 having an outwardly facing surface is centrally mounted within the mold 12. The bladder 28 may be secured to the bottom section 20. Air, inert gas, steam, or hot water from a source (not shown) may be introduced into the bladder 28 to inflate the bladder 28. Air, inert gas, steam, or hot water may also be released from the bladder 28 so as to collapse the bladder 28. The bladder 28 is typically constructed of rubber or other type of elastomer.

The method of the present invention is not limited in any way to the foregoing type of tire press. The method of the present invention may be practiced in any type of tire press, or other molding machine, and the invention is not limited to tires.

In accordance with the method of the present invention, the green tire 14 is built from vulcanizable rubber compound containing the fouling inhibitor composition of the present invention. The green tire 14 is built using conventional tire building methods. The green tire 14 is loaded into the bottom section 20 of the mold 12 when the top section 16 is in the open position. Air, inert gas, steam, or hot water is introduced into the bladder 28 to inflate the bladder 28 and then the top section 16 is moved to the closed position. (FIG. 1 shows the top section 16 moving downward from the open position to the closed position.) Heating fluid is then supplied to the skirt 24, thereby heating the green tire 14 to commence vulcanization.

When vulcanization is complete, the bladder 28 is deflated and the top section 16 is moved to the open position. The cured tire 14 is then removed from the mold 12, thereby completing one cycle of the mold 12. A green second tire (not shown) containing the fouling inhibitor composition of the present invention may then be loaded into the bottom section 20 to begin a second cycle of the mold 12. Once again, the bladder 28 is inflated, the top section 16 is moved to the closed position, the green second tire is vulcanized, the bladder 28 is deflated, the top section 16 is opened and the cured second tire is removed. Subsequent cycles of the mold 12 are then run in the same manner as the first two cycles until the mold 12 needs to be cleaned, i.e., until a mold-cleaning interval is reached.

By practicing the method of the present invention and adding the inventive fouling inhibitor composition to the vulcanizable rubber compound, the maximum number of cycles that can be run between cleanings of the mold before the mold must be cleaned in order to produce a commercially acceptable vulcanized rubber product is increased and the necessary mold-cleaning interval is increased. Preferably, the necessary mold-cleaning interval with the use of the inventive fouling inhibitor composition is at least 10, 20, 30, 40, 50, 60, 70, 80, 90, 100, 200, 300, 400, 500, 600, 700, 800, 900, 1000, 1200, 1400, 1600, 1800, 2000 or 3000 percent greater than the necessary mold-cleaning interval without the use of the inventive fouling inhibitor composition. If the necessary mold-cleaning interval without adding the inventive fouling inhibitor composition is 100 cycles and the necessary mold-cleaning interval with addition of the inventive fouling inhibitor composition is 110, 140, 170, 200, 400, 600, 900, 1000, 1100, 1300, 1500, 1700, 1900, 2100 or 3100 cycles, the necessary mold-cleaning interval has been increased 10%, 40%, 70%, 100%, 300%, 500%, 800%, 900%, 1000%, 1200%, 1400%, 1600%, 1800%, 2000% and 3000%, respectively.

Preferably, the method of the present invention is practiced by providing a vulcanizable rubber compound containing 0.2–20 phr of the inventive fouling inhibitor composition and molding many cycles of the product in the mold, repeating the molding cycles until a mold-cleaning interval is reached that is at least 10, 20, 30, 40, 50, 60, 70, 80, 90, 100, 200, 300, 400, 500, 600, 700, 800, 900, 1000, 1200, 1400, 1600, 1800, 2000 or 3000 percent greater than the regular mold-cleaning interval for that mold.

As set forth above, a conventional tire mold is typically cleaned after about 3000 tires have been vulcanized in the tire mold, i.e., a conventional tire mold is run through a mold-cleaning interval of about 3000 cycles. The mold 12 is preferably run through a mold-cleaning interval of at least about 3300, more preferably at least about 3600, more preferably at least about 3900, more preferably at least 4000, more preferably at least about 4,200, more preferably at least about 4,500, more preferably at least about 4,800, more preferably at least about 5,100, more preferably at least about 5,400, more preferably at least about 5,700, more preferably at least about 6,000, cycles.

At the conclusion of the mold-cleaning interval, the mold 12 is cleaned. For example, the mold 12 may be dismantled and removed from the tire press 10, and then cleaned by particle blasting. Once the mold 12 is cleaned, the mold 12 is placed back in the tire press 10. The mold 12 may then be run for another mold-cleaning interval.

The following Examples further illustrate various aspects of the invention. Unless otherwise indicated, the ingredients are combined using methods known in the art or as described above.

EXAMPLE 1

In this example, the fouling inhibitor composition of the present invention was tested in a rubber compound commonly used in the manufacture of automobile tire sidewalls. The inventive fouling inhibitor composition that was tested was 100% unmodified corn starch. A Control Batch 1 and a Batch 1A of radial automobile tire sidewall were prepared pursuant to identical formulations, except for the inventive mold fouling inhibitor composition. In order to accelerate mold fouling characteristics of the Control Batch 1 and the Batch 1A, the amount of sulfur and zinc oxide normally used in a sidewall compound was doubled. In addition, the temperature of vulcanization was increased to 375° F. (191° C.).

The Control Batch 1 and Batch 1A were prepared pursuant to the following formulation, where the amounts are in parts by weight:

| Ingredient | Control Batch 1 | Batch 1A |
| --- | --- | --- |
| SIR-20 natural rubber | 50 | 50 |
| BR1207 polybutadiene synthetic rubber | 50 | 50 |
| N330 carbon black reinforcing filler | 50 | 50 |
| Sundex 790 aromatic oil | 8 | 8 |
| Zinc oxide cure activator | 9 | 9 |
| Stearic acid cure activator | 1.5 | 1.5 |
| Flectol TMQ antioxidant | 2 | 2 |
| SP-1068 phenolic tackifier | 4 | 4 |
| Fouling inhibitor composition | 0 | 3 |
| 240 paraffin wax | 2 | 2 |
| Rubbermakers soluble sulfur | 3.2 | 3.2 |
| Santocure MOR benzothiazole accelerator | 1.75 | 1.75 |
| Total weight | 181.45 | 184.45 |

Except where specifically noted, the Control Batch 1 and Batch 1A were each prepared using the mixing sequence described below. As noted below, a laboratory Brabender internal mixer was used in the beginning steps, while a labratory two-roll mill was used in the latter steps. In the Brabender internal mixer, the initial chamber temperature was 158° F. (70° C.) and the speed was set at 60 rpm.

The natural rubber, the synthetic rubber, and the zinc oxide were added to the Brabender internal mixer and mixed for 30 seconds. The phenolic tackifier and 75 percent of the carbon black were then added. In Batch 1A, the fouling inhibitor composition was also added. The components were then mixed for about 2 minutes. The remaining 25% of the carbon black, the antioxidant, the stearic acid cure activator, the paraffin wax, and the aromatic oil were then added and mixed for about 2 minutes. The components were discharged from the Brabender internal mixer and cooled to room temperature. The components were then placed on the two-roll mill and the sulfur and the accelerator added thereto. The components were mixed until the sulfur and accelerator were fully incorporated and then discharged from the two-roll mill.

The fully mixed Control Batch 1 and Batch 1A were then tested for vulcanization characteristics on an oscillating disc Rheometer in accordance with ASTM D2804, with the following results:

| Characteristic | Control Batch 1 | Batch 1A |
| --- | --- | --- |
| maximum torque (inch-lbs) | 82.8 | 83.3 |
| minimum torque (inch-lbs) | 8.41 | 8.85 |
| Ts1 (minutes) | 1.06 | .94 |
| Tc90 (minutes) | 2.96 | 2.90 |

As shown by the foregoing results, the inventive fouling inhibitor composition did not have a significant effect on the vulcanization of the rubber compound.

The Control Batch 1 and the Batch 1A were cured and then their physical properties were tested. The Control Batch 1 and the Batch 1A were tested for hardness in accordance with ASTM D2240, for stress-strain characteristics in accordance with ASTM D412, and tear strength in accordance with ASTM D624, all with the following results:

| Physicals | Control Batch 1 | Batch 1A |
| --- | --- | --- |
| Shore A hardness | 61 | 61 |
| Tensile strength (psi) | 2770 | 2715 |
| 100% Modulus (psi) | 290 | 290 |
| 300% Modulus (psi) | 1360 | 1405 |
| Elongation (%) | 475 | 480 |
| Die-C tear strength (psi) | 255 | 260 |

As shown by the foregoing results, the inventive fouling inhibitor composition did not have a significant effect on the cured physical properties of the rubber compound.

The mold fouling characteristics of the Control Batch 1 and the Batch 1A were measured using two 5 inch by 5 inch aluminum plaques and 20 samples of each of the Control Batch 1 and the Batch 1A. Each of the samples was approximately 30 grams. The two aluminum plaques were cleaned with toluene and then precisely weighed; each weighed about 11.18 g. The 20 samples of the Control Batch 1 were consecutively vulcanized against one aluminum plaque (the "Control Batch 1 Plaque"), while the 20 samples of the Batch 1A were consecutively vulcanized against the other aluminum plaque (the "Batch 1A Plaque"). The vulcanizations were performed using a 20 ton psi curing press. Each sample was vulcanized for five minutes at 375 F. (191°C.). After the vulcanization of the samples was completed, the Control Batch 1 Plaque and the Batch 1A Plaque were visually observed and precisely weighed. The Control Batch 1 Plaque had a visible residue accumulation and weight gain of 0.0152 percent. The Batch 1A Plaque was visibly clean and had no weight gain. Thus, the Batch 1A with the inventive fouling inhibitor composition produced 100 percent less mold fouling than the Control Batch 1 without the inventive fouling inhibitor composition. Accordingly, the inventive mold fouling inhibitor composition greatly reduces mold fouling caused by repeated vulcanizations of products composed of the rubber compound.

EXAMPLE 2

In this example, the fouling inhibitor composition of the present invention was tested in Therban C4550, which is a hydrogenated nitrile-butadiene rubber (HNBR) sold by Bayer AG. HNBR is commonly used in the manufacture of gaskets. The inventive fouling inhibitor composition that was tested was 100% unmodified corn starch. A Control Batch 2 and a Batch 2A of a gasket were prepared pursuant to identical formulations, except for the inventive mold fouling inhibitor composition. As in Example 1, the mold fouling rates of the Control Batch 2 and the Batch 2A were accelerated.

The Control Batch 2 and the Batch 2A were prepared pursuant to the following formulation, where the amounts are in parts by weight:

| Ingredient | Control Batch 2 | Batch 2A |
| --- | --- | --- |
| Therban C4550 | 100 | 100 |
| N330 carbon black | 40 | 40 |
| Zinc oxide cure activator | 5 | 5 |
| Stearic acid cure activator | 1 | 1 |
| AgeRite Stalite antioxidant | 1.5 | 1.5 |
| Fouling inhibitor composition | 0 | 3 |
| Sulfur | .6 | .6 |

-continued

| Ingredient | Control Batch 2 | Batch 2A |
|---|---|---|
| TMTD (tetramethyl thiuram disulfide) | 2 | 2 |
| CBTS (N-cyclohexyl-2-benzothiazole sulfanamide) | .5 | .5 |
| Total weight | 150.6 | 153.6 |

The Control Batch 2 and Batch 2A were each prepared using a mixing sequence similar to the mixing sequence used in Example 1. The fully mixed Control Batch 2 and Batch 2A were then tested for vulcanization characteristics on an oscillating disc Rheometer in accordance with ASTM D2804, with the following results:

| Characteristic | Control Batch 2 | Batch 2A |
|---|---|---|
| maximum torque (inch-lbs) | 94.53 | 93.06 |
| minimum torque (inch-lbs) | 9.48 | 10.54 |
| Ts1 (minutes) | 1.5 | 1.48 |
| Tc90 (minutes) | 3.46 | 4.04 |

As shown by the foregoing results, the inventive fouling inhibitor composition did not have a significant effect on vulcanization of the HNBR compound.

The Control Batch 2 and the Batch 2A were cured and then their physical properties were tested. The Control Batch 2 and the Batch 2A were tested for hardness in accordance with ASTM D2240, for stress-strain characteristics in accordance with ASTM D412, and tear strength in accordance with ASTM D624, all with the following results:

| Physicals | Control Batch 2 | Batch 2A |
|---|---|---|
| Shore A hardness | 75 | 75 |
| Tensile strength (psi) | 4460 | 4555 |
| 100% Modulus (psi) | 475 | 470 |
| 300% Modulus (psi) | 2510 | 2500 |
| Elongation (%) | 465 | 480 |
| Die-C tear strength (psi) | 315 | 310 |

As shown by the foregoing results, the inventive fouling inhibitor composition did not have a significant effect on the cured physical properties of the HNBR compound.

The mold fouling characteristics of the Control Batch 2 and the Batch 2A were measured using substantially the same method used in Example 1. The initial weight of each plaque was almost 11.78 g. After 20 cycles were run, the plaque used with Control Batch 2 had a weight gain of 0.1081 percent, whereas the plaque used with Batch 2A had a weight gain of 0.02376 percent. Thus, the Batch 2A with the inventive fouling inhibitor composition produced 78 percent less mold fouling than the Control Batch without the inventive fouling inhibitor composition. Assuming the build-up of mold fouling was linear, each cycle of Batch 2A resulted in a weight gain of 0.001188 percent. At this rate, it would take 91 cycles of Batch 2A to yield the mold fouling of 20 cycles of Control Batch 2. If the necessary mold-cleaning interval is reached after a weight gain of 0.1081 percent, the necessary mold-cleaning interval was increased 355% ([91–20]÷20) by the addition of the fouling inhibitor composition of the invention. Accordingly, the inventive mold fouling inhibitor composition substantially reduces mold fouling caused by repeated vulcanizations of products composed of the HNBR compound.

EXAMPLE 3

Example 2 was repeated, except that 3 parts of a fouling inhibitor composition consisting of 90 weight percent corn starch and 10 weight percent factice (Akrofax 57) was substituted for the 100% corn starch fouling inhibitor composition of Example 2. In Example 3 the plaque used with the control (Control Batch 3) had a weight gain of 0.171%; the plaque used with the batch with the corn starch/factice (Batch 3A) had a weight gain of 0.0077%, which is a mold fouling reduction of 55%. The addition of the corn starch/factice had little or no effect on cure and physical properties.

EXAMPLE 4

Example 1 was repeated, except that 3.75 parts by weight of a fouling inhibitor composition consisting of 85 weight percent corn starch and 15 weight percent polyethylene wax (AC 617-A) was substituted for the 100% corn starch fouling inhibitor composition of Example 1. In Example 4 the plaque used with the control (Control Batch 4) had a weight gain of 0.01229%; the plaque used with the batch with the starch/wax (Batch 4A) had a weight gain of 0.00527%, which is a mold fouling reduction of 57.12%. Also, a Batch 4B was run, where 3 parts 100% corn starch was substituted for the starch/wax inhibitor composition in Batch 4A. The plaque used with Batch 4B had a weight gain of 0.00614%, which is a mold fouling reduction of 50.04%.

EXAMPLE 5

Example 1 was repeated, with Control Batch 5 and Batch 5A the same as Control Batch 1 and Batch 1A, respectively. In addition, Batch 5B was also run. Batch 5B was the same as Batch 5A, except that 3 parts Amaizo 1110 dextrin was substituted for the 100% corn starch. In Example 5 the plaque used with the control (Control Batch 5) had a weight gain of 0.02688%; the plaque used with the corn starch batch (Batch 5A) had a weight gain of 0.01261%, which is a mold fouling reduction of 53.09%; the plaque used with the dextrin batch (Batch 5B) had a weight gain of 0.01343%, which is mold fouling reduction of 50.03%. The addition of the corn starch (Batch 5A) and the dextrin (Batch 5B) had little or no effect on cure and physical properties.

As shown by the foregoing results of Examples 1–5, when the inventive fouling inhibitor composition is added to vulcanizable rubber products before they are vulcanized in a mold, the inventive fouling inhibitor composition greatly and substantially reduces fouling of the mold, while not significantly affecting the vulcanization of the rubber products, or their cured physical properties. The results of Examples 1–5 were surprising and unexpected.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A method of reducing fouling of a mold caused by vulcanization of a rubber compound in the mold, said method comprising the steps of adding about 0.2–20 phr of a fouling inhibitor composition to the rubber compound and thereafter vulcanizing the rubber compound in the mold, said fouling inhibitor composition comprising starch and being substantially free of cross-linked fatty acids, asphalt, tackifying resins, and synthetic plasticizers.

2. The method of claim 1, wherein said fouling inhibitor composition is at least 60 weight percent starch.

3. The method of claim 2, wherein said fouling inhibitor composition is added to said rubber compound at the rate of 0.5–10 phr.

4. The method of claim 2, wherein said fouling inhibitor composition is at least 80 weight percent starch.

5. The method of claim 2, wherein said fouling inhibitor composition comprises 1–15 weight percent of a processing promoter.

6. The method of claim 5, wherein said processing promoter is selected from the group consisting of factice and polyethylene wax and mixtures thereof.

7. The method of claim 3, wherein said fouling inhibitor composition is at least 80 weight percent unmodified corn starch.

8. The method of claim 7, wherein said fouling inhibitor composition comprises 2–15 weight percent of a processing promoter.

9. The method of claim 8, wherein said processing promoter is factice.

10. A method of producing vulcanized rubber compounds comprising the steps of:

(a) providing a mold;

(b) providing a vulcanizable rubber compound containing about 0.2–20 phr of a fouling inhibitor composition comprising starch;

(c) placing the vulcanizable rubber compound in said mold and vulcanizing the rubber compound to form a vulcanized rubber compound;

(d) removing the vulcanized rubber compound from said mold; and (e) repeating steps (b)–(d) in said mold until a mold-cleaning interval is reached that is at least 10% greater than the regular mold-cleaning interval for said mold.

11. The method of claim 10, wherein said fouling inhibitor composition comprises at least 60 weight percent starch.

12. The method of claim 11, wherein said vulcanizable rubber compound contains 0.5–10 phr of said fouling inhibitor composition.

13. The method of claim 11, wherein said fouling inhibitor composition comprises at least 80 weight percent starch.

14. The method of claim 11, wherein said fouling inhibitor composition comprises 1–15 weight percent of a processing promoter.

15. The method of claim 14, wherein said processing promoter is selected from the group consisting of factice and polyethylene wax and mixtures thereof.

16. The method of claim 12, wherein said fouling inhibitor composition is at least 80 weight percent unmodified corn starch.

17. The method of claim 16, wherein said fouling inhibitor composition comprises 2–15 weight percent of a processing promoter.

18. The method of claim 17, wherein said processing promoter is factice.

19. The method of claim 11, wherein the fouling inhibitor composition is substantially free of cross-linked fatty acids, asphalt, tackifying resins, and synthetic plasticizers.

20. The method of claim 10, wherein steps (b)–(d) are repeated until a mold-cleaning interval is reached that is at least 40% greater than the regular mold-cleaning interval for said mold.

21. The method of claim 10, wherein steps (b)–(d) are repeated until a mold-cleaning interval is reached that is at least 100% greater than the regular mold-cleaning interval for said mold.

22. The method of claim 11, wherein said mold is a tire mold and the vulcanized rubber compound removed from the mold is a vulcanized rubber tire.

23. The method of claim 22, wherein steps (b)–(d) are repeated until a mold-cleaning interval of at least 4000 cycles is reached.

* * * * *

UNITED STATES PATENT AND TRADEMARK OFFICE
CERTIFICATE OF CORRECTION

PATENT NO.     : 6,096,248
DATED          : August 1, 2000
INVENTOR(S)    : Cameron R. Fraser et al.

It is certified that error appears in the above-identified patent and that said Letters Patent is hereby corrected as shown below:

<u>Title page,</u>
Item [56], References Cited, OTHER PUBLICATIONS,
Delete "19994," and insert therefore -- 1994, --.
Delete "93 55491," and insert therefore -- 92 55491, --.

OTHER PUBLICATIONS,
Delete "675-379." and insert therefore -- 375-379 --.
Delete "E.W. Tjp, as." and insert therefore -- E.W. Thomas, --.
Insert a new line as follows -- Abstract of Japanese Patent Publication No. 09183857, publication date 7/15/1997, Title: "Antifouling agent-containing resin molding and its production". --.

Signed and Sealed this

Twenty-second Day of October, 2002

*Attest:*

*Attesting Officer*

JAMES E. ROGAN
*Director of the United States Patent and Trademark Office*